United States Patent
Wakumoto et al.

(10) Patent No.: US 7,636,315 B2
(45) Date of Patent: Dec. 22, 2009

(54) BROADCAST TRACEROUTE

(75) Inventors: Shaun Kazuo Wakumoto, Roseville, CA (US); Ballard Claude Bare, Auburn, CA (US); Michael Patmon, Roseville, CA (US); Cetin Ersoy, Portsmounth, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 777 days.

(21) Appl. No.: 11/157,683

(22) Filed: Jun. 21, 2005

(65) Prior Publication Data

US 2006/0285498 A1 Dec. 21, 2006

(51) Int. Cl.
*G01R 31/08* (2006.01)

(52) U.S. Cl. .................. 370/238; 370/254; 370/255

(58) Field of Classification Search ............. 370/228, 370/252, 255, 310, 328, 351, 400; 709/239–242; 455/422.1
See application file for complete search history.

(56) References Cited

U.S. PATENT DOCUMENTS

| | | | |
|---|---|---|---|
| 5,987,011 A * | 11/1999 | Toh | 370/331 |
| 6,421,726 B1 * | 7/2002 | Kenner et al. | 709/225 |
| 6,580,715 B1 | 6/2003 | Bare | |
| 6,628,620 B1 * | 9/2003 | Cain | 370/248 |
| 6,870,846 B2 * | 3/2005 | Cain | 370/392 |
| 6,975,619 B1 * | 12/2005 | Byers et al. | 370/351 |
| 7,139,242 B2 * | 11/2006 | Bays | 370/238 |
| 7,149,917 B2 * | 12/2006 | Huang et al. | 714/4 |
| 7,260,645 B2 * | 8/2007 | Bays | 709/238 |
| 7,263,552 B2 * | 8/2007 | Govindarajan et al. | 709/224 |
| 7,330,889 B2 * | 2/2008 | Foody et al. | 709/224 |
| 7,352,705 B1 * | 4/2008 | Adhikari et al. | 370/248 |
| 7,447,222 B2 * | 11/2008 | Wakumoto et al. | 370/406 |

OTHER PUBLICATIONS

HP Proactive Networking, "Achieving High Performance Through Load-Balancing VLANS, and Broadcast/Multicast Control", White Paper, Aug. 1998, pp. 1-14.

* cited by examiner

*Primary Examiner*—Pankaj Kumar
*Assistant Examiner*—Mark Mais

(57) ABSTRACT

One embodiment relates to a method by a switch of tracing a broadcast path from the switch through a group of switches. A broadcast traceroute packet is issued with a first hop entry from each port within the broadcast path. Trace hop packets are received from hop switches within the broadcast path, and trace complete packets are received from end switches within the broadcast path. Other embodiments are also disclosed.

29 Claims, 19 Drawing Sheets

```
0                   1                   2                   3       bits
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+  --------
|                     mesh header    302                        |  |      |
. . . . . . . . . . . . . . . . . . . . . . . . . . . . . . . .  32 bytes
|                                                               |  |      |
+-+-+-+-+-+-+-+-+-+-+-+-+-+-+-+-+-+-+-+-+-+-+-+-+-+-+-+-+-+-+-+-+  --------
|    version    |    sequence   |             flags             |
|      304      |   number 306  |              308              |
+-+-+-+-+-+-+-+-+-+-+-+-+-+-+-+-+-+-+-+-+-+-+-+-+-+-+-+-+-+-+-+-+
|         marked bits           |hop cnt|          pad          |
|             310               |  312  |          314          |
+-+-+-+-+-+-+-+-+-+-+-+-+-+-+-+-+-+-+-+-+-+-+-+-+-+-+-+-+-+-+-+-+
|                            reserved                           |
|                              316                              |
+-+-+-+-+-+-+-+-+-+-+-+-+-+-+-+-+-+-+-+-+-+-+-+-+-+-+-+-+-+-+-+-+
|                       hop entries     318                     |
. . . . . . . . . . . . . . . . . . . . . . . . . . . . . . . .
|                                                               |
+-+-+-+-+-+-+-+-+-+-+-+-+-+-+-+-+-+-+-+-+-+-+-+-+-+-+-+-+-+-+-+-+
```

FIG. 3

```
0                   1                   2                   3   bits
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          flags        | branch count  |    reserved   |
|           402         |      404      |      406      |
+-+-+-+-+-+-+-+-+-+-+-+-+-+-+-+-+-+-+-+-+-+-+-+-+-+-+-+-+-+-+-+-+
|                    switch mac address                         |
|                           408                                 |
+-+-+-+-+-+-+-+-+-+-+-+-+-+-+-+-+-+-+-+-+-+-+-+-+-+-+-+-+-+-+-+-+
|   switch mac address (cont)   |  input port   |  input port   |
|                               |  number 409   |  name 410     |
+-+-+-+-+-+-+-+-+-+-+-+-+-+-+-+-+-+-+-+-+-+-+-+-+-+-+-+-+-+-+-+-+
|    input port name (cont)     |  output port  |  output port  |
|                               |  number 412   |  name 414     |
+-+-+-+-+-+-+-+-+-+-+-+-+-+-+-+-+-+-+-+-+-+-+-+-+-+-+-+-+-+-+-+-+
|      output port name (cont)                  |  port speed   |
|                                               |     416       |
+-+-+-+-+-+-+-+-+-+-+-+-+-+-+-+-+-+-+-+-+-+-+-+-+-+-+-+-+-+-+-+-+
```

FIG. 4A

```
0                   1                   2                   3    bits
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            flags          | branch count  |    reserved       |
|             402           |     404       |      406          |
+-+-+-+-+-+-+-+-+-+-+-+-+-+-+-+-+-+-+-+-+-+-+-+-+-+-+-+-+-+-+-+-+
|                        switch mac address                     |
|                             408                               |
+-+-+-+-+-+-+-+-+-+-+-+-+-+-+-+-+-+-+-+-+-+-+-+-+-+-+-+-+-+-+-+-+
|   switch mac address (cont)   |      input port number        |
|                               |             409               |
+-+-+-+-+-+-+-+-+-+-+-+-+-+-+-+-+-+-+-+-+-+-+-+-+-+-+-+-+-+-+-+-+
|                         input port name                       |
|                              410                              |
+-+-+-+-+-+-+-+-+-+-+-+-+-+-+-+-+-+-+-+-+-+-+-+-+-+-+-+-+-+-+-+-+
|                         input port cost                       |
|                              450                              |
+-+-+-+-+-+-+-+-+-+-+-+-+-+-+-+-+-+-+-+-+-+-+-+-+-+-+-+-+-+-+-+-+
|       output port speed       |      output port number       |
|              416              |              412              |
+-+-+-+-+-+-+-+-+-+-+-+-+-+-+-+-+-+-+-+-+-+-+-+-+-+-+-+-+-+-+-+-+
|                         output port name                      |
|                              414                              |
+-+-+-+-+-+-+-+-+-+-+-+-+-+-+-+-+-+-+-+-+-+-+-+-+-+-+-+-+-+-+-+-+
|                         output port cost                      |
|                              452                              |
+-+-+-+-+-+-+-+-+-+-+-+-+-+-+-+-+-+-+-+-+-+-+-+-+-+-+-+-+-+-+-+-+
```

FIG. 4B

```
/* operational mode flags   */
TRACE_DISCOVER              0x00000001    /* bcast trace discovery mode */
TRACE_HOP                   0x00000002    /* hop switch response        */
TRACE_COMPLETE              0x00000004    /* trace is done; check the   */
                                          /* status bits for result     */
LOOP_DISCOVER               0x00000008    /* loop detection mode        */
```

FIG. 5A

```
/* operational status flags */
TRACE_FOUND                 0x00010000    /* trace was successful       */
TRACE_UNKNOWN_ADDR_FAIL     0x00020000    /* switch doesn't know        */
                                          /* original switch            */
TRACE_RTX_FAIL              0x00040000    /* no response from hop switch */
TRACE_LOOP_DETECT           0x00080000    /* loop in bcast paths        */
```

FIG. 5B

A,B,C,D are mesh switches

```
Normal Mode:

+----------------------------------------------------------------------
| switch_A$ meshBcastTraceroute
|
| Key:
|     A: aaaaaa-aaaaaa  (A_hostname)
|     B: bbbbbb-bbbbbb  (B_hostname)
|     C: cccccc-cccccc  (C_hostname)
|     D: dddddd-dddddd  (D_hostname)
|     E: eeeeee-eeeeee  (E_hostname)
|     F: ffffff-ffffff  (F_hostname)
|     G: gggggg-gggggg  (G_hostname)
|     H: hhhhhh-hhhhhh  (H_hostname)
|     I: iiiiii-iiiiii  (I_hostname)
|
| Broadcast Traceroute:
|
|     A(1) -> B(4) -> D(11) -> H
|                     D(10) -> I
|             B(5) -> E
|
|     A(2) -> C(8) -> F
|             C(7) -> G
|
| switch_A$
+----------------------------------------------------------------------
```

FIG. 16A

Display Input Port:

```
+------------------------------------------------------------------
| switch_A$ meshBcastTraceroute -i
|
| Key:
|     A: aaaaaa-aaaaaa  (A_hostname)
|     B: bbbbbb-bbbbbb  (B_hostname)
|     C: cccccc-cccccc  (C_hostname)
|     D: dddddd-dddddd  (D_hostname)
|     E: eeeeee-eeeeee  (E_hostname)
|     F: ffffff-ffffff  (F_hostname)
|     G: gggggg-gggggg  (G_hostname)
|     H: hhhhhh-hhhhhh  (H_hostname)
|     I: iiiiii-iiiiii  (I_hostname)
|
| Broadcast Traceroute:
|
|     A(1) -> (3)B(4) -> (9)D(11) -> (15)H
|                        (9)D(10) -> (16)I
|             (3)B(5) -> (12)E
|
|     A(2) -> (6)C(8) -> (13)F
|             (7)C(7) -> (14)G
|
| switch_A$
+------------------------------------------------------------------
```

FIG. 16B

Verbose Output:

```
+---------------------------------------------------------------------
| switch_A$ meshBcastTraceroute -V
|
| Key:
|     A: aaaaaa-aaaaaa  (A_hostname)
|     B: bbbbbb-bbbbbb  (B_hostname)
|     C: cccccc-cccccc  (C_hostname)
|     D: dddddd-dddddd  (D_hostname)
|     E: eeeeee-eeeeee  (E_hostname)
|     F: ffffff-ffffff  (F_hostname)
|     G: gggggg-gggggg  (G_hostname)
|     H: hhhhhh-hhhhhh  (H_hostname)
|     I: iiiiii-iiiiii  (I_hostname)
|
| Hop Switch Packets:
|     A(1) -> B(4) -> D
|     A(2) -> C(8) -> F
|     A(1) -> B(5) -> E
|     A(2) -> C(7) -> G
|     A(1) -> B(4) -> D(11) -> H
|     A(1) -> B(4) -> D(10) -> I
|
| Broadcast Traceroute:
|
|     A(1) -> B(4) -> D(11) -> H
|                     D(10) -> I
|             B(5) -> E
|
|     A(2) -> C(8) -> F
|             C(7) -> G
|
| switch_A$
+---------------------------------------------------------------------
```

FIG. 16C

BROADCAST TRACEROUTE

BACKGROUND OF THE INVENTION

1. Field of the Invention

The present invention relates generally to communication networks.

2. Description of the Background Art

It is common in conventional computing environments to connect a plurality of computing systems or "hosts" through a communication medium often referred to as a network. The network permits the hosts to exchange and share information. Networks typically include various network devices, such as routers, switches, and hubs, in addition to the interconnected hosts.

Networks may be configured and graphically depicted in a wide variety of common topologies. The particular configurations of network communication links and devices between a particular pair of hosts wishing to exchange information may be widely varied. Any particular connection between two hosts attached to a network may be direct or may pass through a large number of intermediate devices in the network. Networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations. At one level of network communication, such addresses are often referred to as MAC (Media ACcess) addresses. Network protocols operable above this lowest level of communication may use other addresses, such as IP (Internet Protocol) addresses, for other purposes in the higher-level communication techniques.

Switches as conventionally practiced in the art often use a protocol commonly referred to as "spanning tree protocol" to discover the existence of redundant communication paths as known to a network of switches. There are three spanning tree protocols: IEEE 802.1d, 802.1w and 802.1s. See also the proposed IEEE standard P802.1p entitled "Standard for Local and Metropolitan Area Networks Supplement to Media Access Control (MAC) Bridges: Traffic Class Expediting and Dynamic Multicast Filtering."

SUMMARY

One embodiment relates to a method by a switch of tracing a broadcast path from the switch through a group of switches. A broadcast traceroute packet is issued with a first hop entry from each port within the broadcast path. Trace hop and trace complete packets are received from other switches within the broadcast path.

Another embodiment relates to a networking switch configured to be able to trace a broadcast path originating from the switch through a group of switches. The switch includes computer-readable code configured to issue a broadcast traceroute packet with a first hop entry from each port within the broadcast path. The switch also includes computer-readable code configured to process trace hop and trace complete packets received from other switches within the broadcast path.

Another embodiment relates to a networking apparatus configured with procedures for a broadcast traceroute protocol. Processor-executable code in the apparatus is configured so that, upon initiation of a broadcast traceroute at the apparatus, broadcast traceroute packets are issued to trace a broadcast path from the apparatus through a group of networking apparatus. In addition, processor-executable code in the apparatus is configured so that, upon receiving a broadcast traceroute packet originating from another networking apparatus, the apparatus determines whether the apparatus is in a hop position or an end position within a broadcast path of the originating apparatus.

Other embodiments are also described.

BRIEF DESCRIPTION OF THE DRAWINGS

FIG. 3 is a diagram of a broadcast traceroute packet format in accordance with an embodiment of the invention.

FIG. 4A is a diagram of a hop entry format in accordance with an embodiment of the invention.

FIG. 4B is a diagram of a hop entry format in accordance with another embodiment of the invention.

FIGS. 5A and 5B show operational mode flags and operational status flags, respectively, in accordance with an embodiment of the invention.

FIGS. 16A, 16B and 16C show three example formats for outputting broadcast traceroute information to a user in accordance with an embodiment of the invention.

DETAILED DESCRIPTION

While the below discussion focuses on a switching mesh made up of member switches running a meshing protocol. Embodiments of the present invention may be applicable to other groups or domains of switches made up of member switches running other protocols. The methods of embodiments of the invention may, for example, by implemented using computer-readable code which is executable by a processor within the switches.

Figure 1:
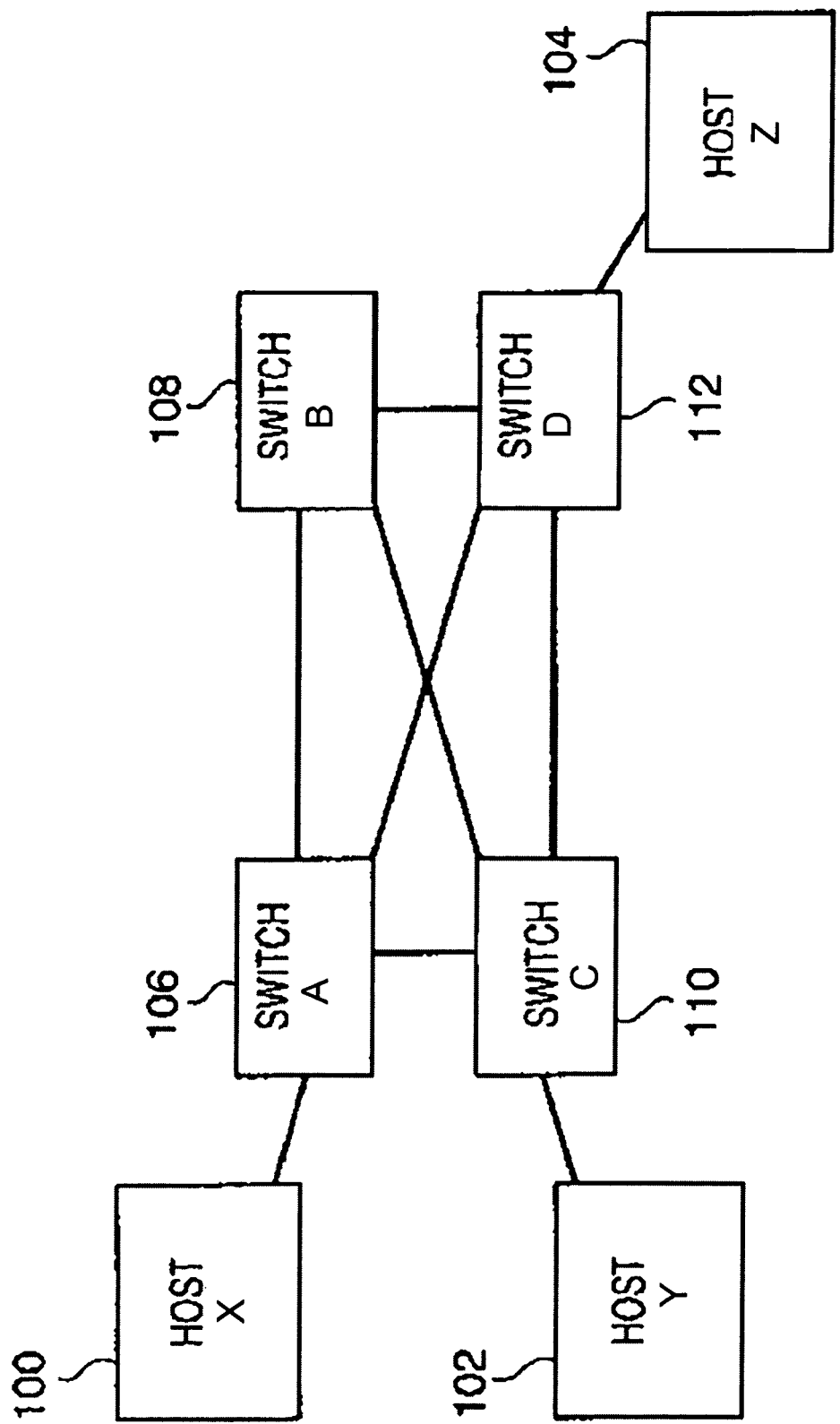
FIG. 1 is a diagram depicting an example network including a switching mesh.

FIG. 1 is a diagram depicting an example network including a switching mesh. The switching mesh includes a network of multiple switches, for example the four switches (Switch A 106, Switch B 108, Switch C 110, and Switch D 112) shown in FIG. 1. Each mesh switch implement meshing protocols. One implementation of meshing protocols is described, for example, in U.S. Pat. No. 6,580,715, entitled "Load Balancing Switch Protocols," issued Jun. 17, 2003 to Ballard C. Bare, the disclosure of which is hereby incorporated by reference.

The switching mesh includes redundant paths between the switches therein such that multiple possible paths exist for communication between host devices, such as hosts X 100, Y 102, and Z 104 shown in FIG. 1. Where a first path through the switching mesh fails, another path may be activated.

Within a mesh topology, every switch in the mesh has its own broadcast path. Each broadcast path comprises a spanning tree where the owner switch is at the root of the tree. The broadcast paths in a switching mesh may be used to send broadcast, multicast, and certain protocol packets to every other switch in the mesh. The pruned tree is set up once going back to each source switch. All broadcast and multicast packets originating from the same switch use the same pruned tree. When link failures occur, or when new or recovered links are brought up, then the pruned tree for each switch may be re-built.

Determining the path that a broadcast (bcast) packet would take through the switching mesh can be a difficult task. Unlike a normal set of layer 2 switches, the broadcast path differs between switches. Each switch has its own broadcast path. A broadcast packet originating from a particular switch will follow a pruned tree from that switch in which all other switches shall receive the packet once and only once.

To advantageously aid debugging of network problems in-house and in the field, the present application discloses a broadcast (bcast) traceroute protocol. The bcast traceroute protocol allows a user to quickly determine the path that a broadcast or multicast packet would take through a switching mesh. The bcast traceroute protocol may also be used in detecting and fixing broadcast loops within the switching mesh.

Figure 2A:
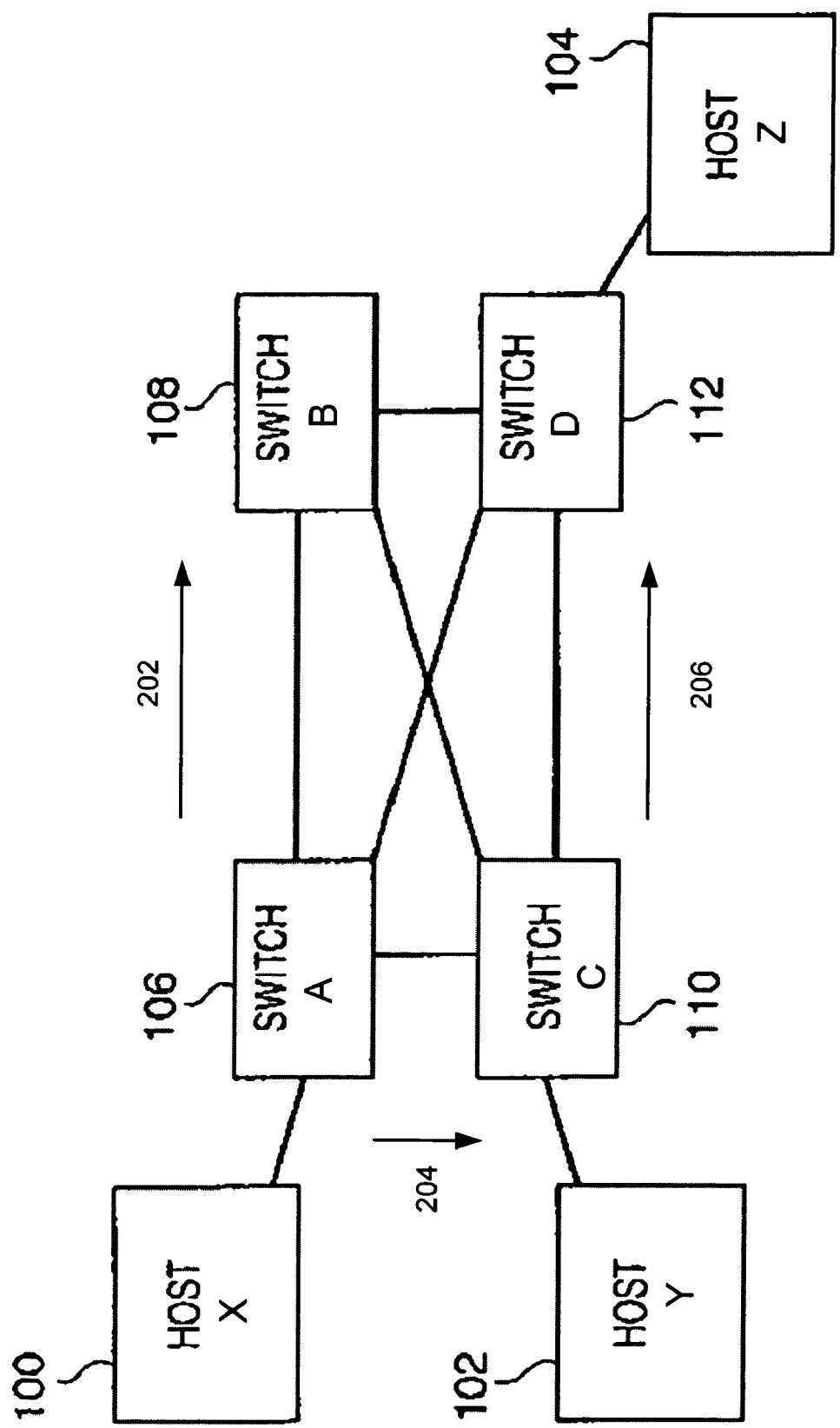
FIGS. 2A and 2B are diagrams depicting two different broadcast paths through the switching mesh in the example network of FIG. 1.
Figure 2B:
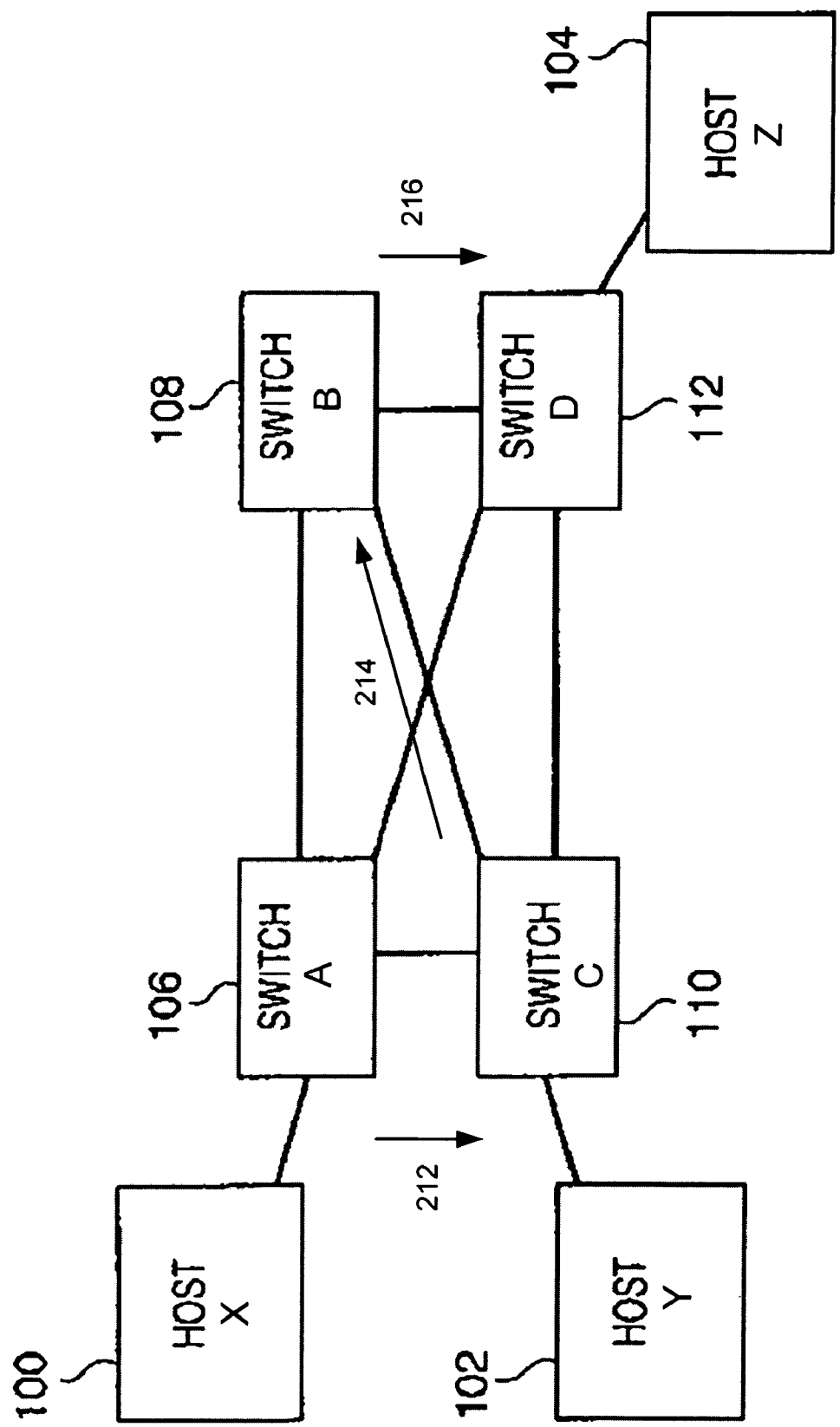

FIGS. 2A and 2B are diagrams depicting two different broadcast paths through the switching mesh in the example network of FIG. 1. Both broadcast paths originate from Switch A. In other words, Switch A is the original switch which sends out the broadcast or multicast.

In FIG. 2A, the broadcast path originating at Switch A goes from Switch A to Switches B (hop 202) and C (hop 204), and from Switch C to Switch D (hop 206). In this example, Switches B and D are end switches, and Switch C is a hop switch.

In FIG. 2B, the broadcast path originating at Switch A goes from Switch A to Switch C (hop 212), from Switch C to Switch B (hop 214), and from Switch B to Switch D (hop 216). In this example, Switch D is an end switch, and Switches C and B are hop switches.

The original mesh switch may be defined as the mesh switch that requests the bcast traceroute. A hop mesh switch may be defined as a mesh switch (other than the original mesh switch) that has at least one outgoing port in the original mesh switch's bcast path. An end mesh switch may be defined as a mesh switch that does not have any outgoing ports in the original mesh switch's bcast path. All switches along the broadcast path may forward broadcast/multicast packets out non-meshed ports based on VLAN (virtual local area network) or ACL (access control list) filters.

Example Structure for Broadcast Traceroute Packet

FIG. 3 is a diagram of a broadcast traceroute packet format in accordance with an embodiment of the invention. Of course, variations of this particular format may also be implemented within the spirit and scope of the invention. The bcast traceroute packet shown in FIG. 3 includes the following fields: mesh header 302; version 304; sequence number 306; flags 308; marked bits 310; hop count 312; pad bits 314; reserved bits 316; and hop entries 318.

The mesh header 302 may comprise a conventional mesh header with packet type indicating a request (0×0E, for example) or an acknowledgement (0×8E, for example). The version 304 may indicate the version of the bcast traceroute protocol being utilized. The sequence number 306 is incremented for each packet generated and may wrap around such that after 65,535 it goes back to zero (for a sequence number that is two octets long). The flags 308 include particular flags used by the bcast traceroute protocol. The marked bits 310 include a loop bit for each switch in the switching mesh. In one embodiment, the loop bit for a particular switch may be marked when that switch acts as a hop switch and forwards a broadcast trace packet and may be cleared when that hop switch forwards the completed trace packet to the original mesh switch. The hop count 312 is used to count the number of mesh switches that are hopped and may be incremented with each hop. A hop entry 314 is appended by each hop mesh switch along the way to an end mesh switch. An example format for a hop entry is described below in relation to FIG. 4.

In practice, the number of hop entries in a bcast traceroute packet will be limited due to the protocol used in forming the bcast path. The bcast path may be formed, for example, using a cost-acknowledgement type of protocol, where a cost packet is not forwarded out a port if the cost packet has already been forwarded five times, for instance. In this example, the number of hop entries in a bcast traceroute packet would be effectively limited to seven.

FIG. 4A is a diagram of a hop entry format in accordance with an embodiment of the invention. Of course, variations of this particular format may also be implemented within the spirit and scope of the invention. The hop entry shown in FIG. 4 includes the following fields: flags 402; branch count 404; reserved bits 406; switch MAC address 408; input port number 409; input port name 410; output port number 412; output port name 414; and port speed 416.

The flags 402 of the hop entry may include operational mode flags and operational status flags. The operational mode flags may include, for example, those described below in relation with FIG. 5A, and the operational status flags may include, for example, those described below in relation to FIG. 5B. The branch count 404 is a number of paths used by this hop switch. The reserved bits 406 are bits that may be reserved for future use. The switch MAC address 408 is the MAC address of the mesh switch being hopped. The input port number 409 is the number of the port that the bcast traceroute packet came in on. As discussed further below, the input port number may be used for the return path for the bcast traceroute packet. The input port name 410 is a description of the inbound port in the form of a string (for example, an octet string). The output port number 412 is the number of the port from which the packet will exit the switch. The output port number is used to follow the bcast path from the original mesh switch. The input port name 414 is a description of the outbound port in the form of a string (for example, an octet string). The port speed 416 gives the speed of the outbound port.

FIG. 4B is a diagram of a hop entry format in accordance with another embodiment of the invention. Here, the hop entry format differs from the format of FIG. 4A. The difference is that the input (inbound) port cost 450 and output (outbound) port cost 452 in relation to the broadcast path link are included in this hop entry format. The cost entries may be of various forms, including dropped packet counts or other cost factors, for example. These cost entries may be used, for example, to look for overloaded links along the broadcast path or to perform a broadcast path runtime analysis.

In a broadcast path runtime analysis, the original switch may utilzied the input/output port cost information to calculate the total cost for a broadcast path once it receives all of the trace complete packets. If the original switch has, for example, four broadcast paths, it may execute a broadcast traceroute and calculate the total cost for each of the four broadcast paths. By comparing the total costs for the various broadcast paths, a determination may be made as to the best (i.e. lowest cost) broadcast path.

FIGS. 5A and 5B show operational mode flags and operational status flags, respectively, in accordance with an embodiment of the invention.

As shown in FIG. 5A, the operational mode flags may include a TRACE_DISCOVER flag, a TRACE_HOP flag, a TRACE_COMPLETE flag, and a LOOP_DISCOVER flag. The TRACE_DISCOVER flag indicates that a packet relates to the bcast trace discovery mode. The TRACE_HOP flag indicates that a packet relates to a hop switch response. The TRACE_COMPLETE flag indicates that the bcast trace is done and to check the status bits for the result (whether the trace was successful or not). The LOOP_DISCOVER flag relates to a loop detection mode.

As shown in FIG. 5B, the operational status flags may include a TRACE_FOUND flag, a TRACE_UNKNOWN_ADDR_FAIL flag, a TRACE_RTX_FAIL flag, and a TRACE_LOOP_DETECT flag. The TRACE_FOUND flag indicates that the bcast trace was successful. The TRACE_UNKNOWN_ADDR_FAIL flag indicates that the bcast trace failed because a mesh switch does not know of the original switch. The TRACE_RTX_FAIL flag indicates that the bcast trace failed because even after several retransmissions there was no response from a hop switch. The TRACE_LOOP_DETECT flag indicates that a loop in the bcast path has been detected.

Original Mesh Switch Sending Broadcast Traceroute Packets

Figure 6:
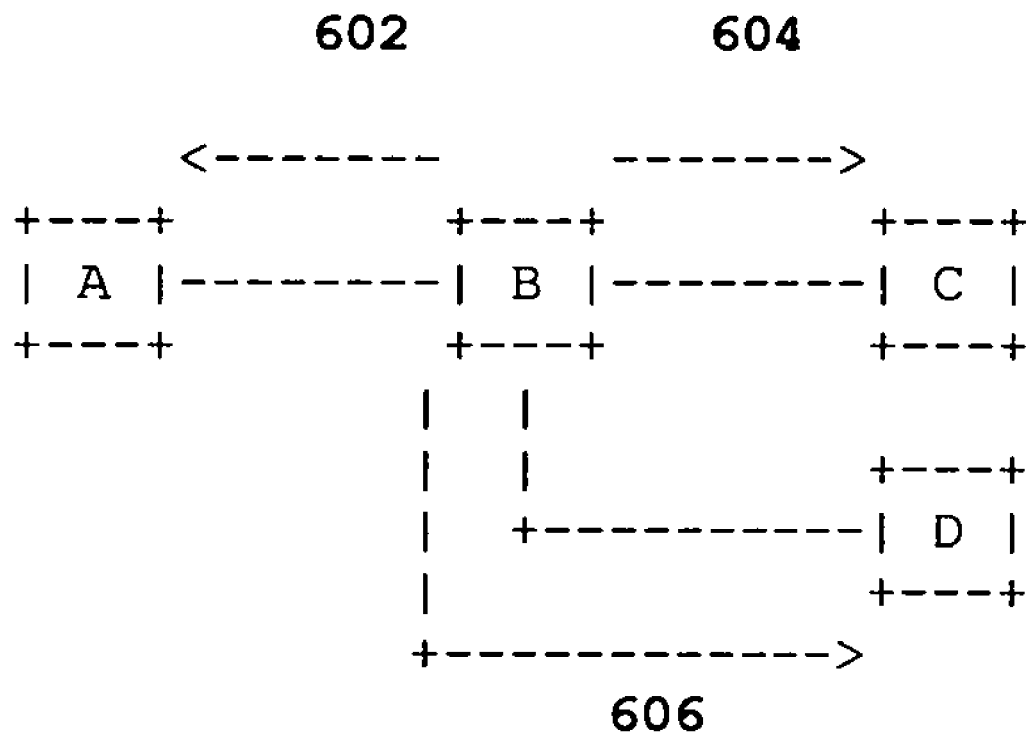
FIG. 6 is a diagram illustrating an original switch (B) sending broadcast traceroute packets in accordance with an embodiment of the invention.

FIG. 6 is a diagram illustrating an original switch (B) sending broadcast traceroute packets in accordance with an embodiment of the invention. Here, four mesh switches are shown (A, B, C and D), and B is the original switch for the bcast traceroute under consideration.

As shown in FIG. 6, the original switch B may send out or issue more than one bcast traceroute packet. In the illustrated example, the arrow lines (602, 604, and 606) represent switch B's bcast path. In other words, when switch B receives a broadcast or multicast packet on a non-mesh port, it will forward the packet out towards each of switches A, C, and D. Hence, when the bcast traceroute protocol is initiated on switch B, switch B issues a first bcast traceroute packet (602) to switch A, issues a second bcast traceroute packet (604) to switch C, and issues a third bcast traceroute packet (606) to switch D.

Figure 7:
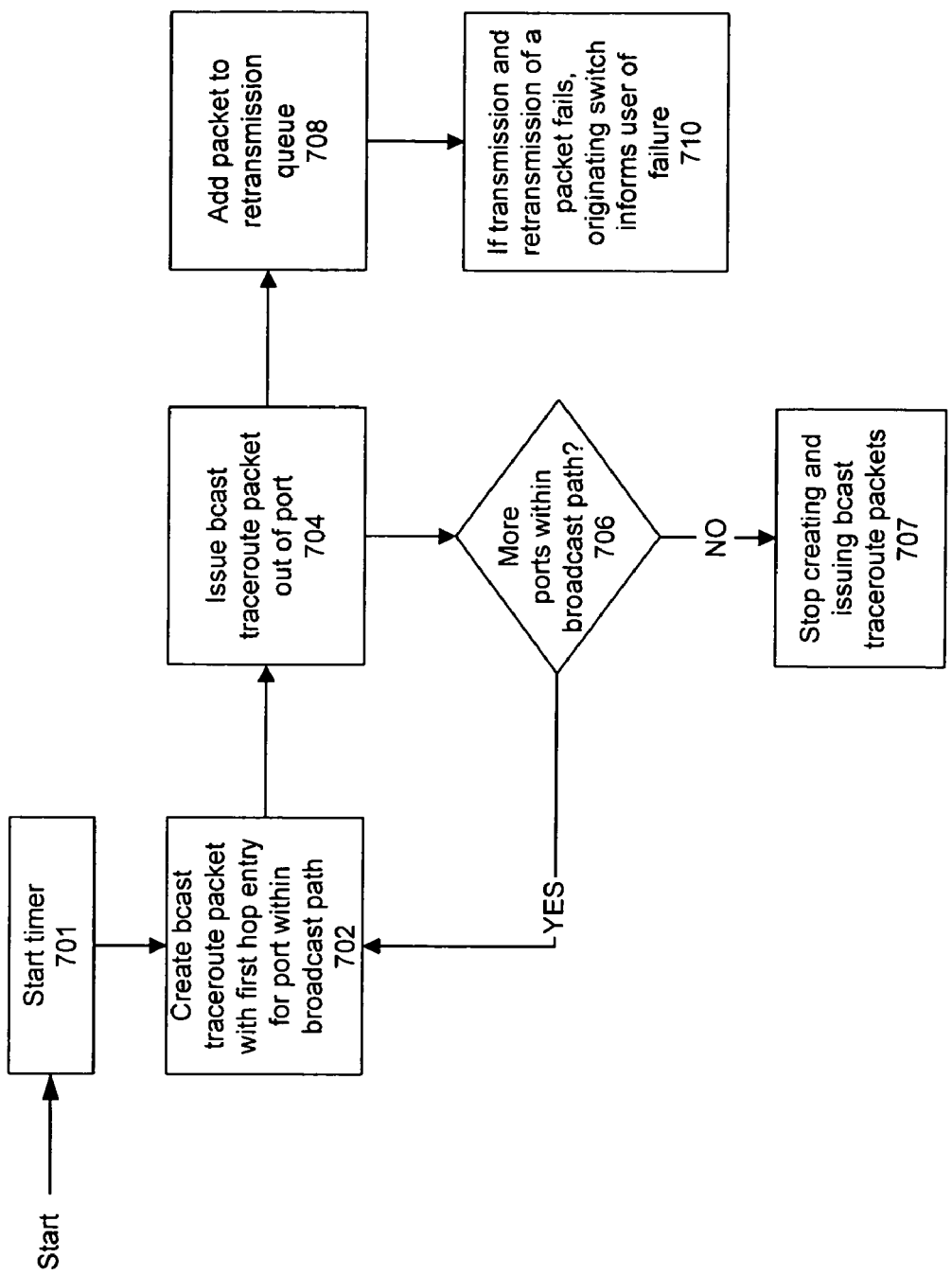
FIG. 7 is a flow chart depicting an automated process for an original mesh switch sending broadcast traceroute packets in accordance with an embodiment of the invention.

FIG. 7 is a flow chart depicting an automated process for an original mesh switch sending broadcast (bcast) traceroute packets in accordance with an embodiment of the invention. The process includes issuing a bcast traceroute packet out of each outgoing port within the broadcast path of the original switch.

As shown in the example procedure of FIG. 7, when a bcast traceroute is initiated, a timer may be started 701 so as to track the time it takes to complete the bcast traceroute, and, if necessary, end the process should the bcast traceroute not complete in a reasonable amount of time (see also FIG. 14, discussed below). At this point, the original mesh switch creates 702 a bcast traceroute packet with a first hop entry for an outgoing port within its broadcast path. The packet has the TRACE_DISCOVER flag marked to indicate that the trace is in the discovery mode. The first hop entry specifies the outbound port being used and is appended to the packet. This bcast traceroute packet is then sent or issued 704 out of the outbound port. A determination 706 may be made as to whether there are more ports on the original switch within its broadcast path. If there are more ports on the original switch within its broadcast path, then the process loops back to step 702 and creates another bcast traceroute packet for another port within its broadcast path. Otherwise, the process stops 707 creating and issuing bcast traceroute packets. In other words, there may be more than one port of the original switch within its broadcast path. If so, the original switch issues a bcast traceroute packet out of each such port. The output port number, name and speed will be changed for each issued bcast traceroute packet.

If the packet is going out multiple ports due to a branch in the broadcast tree, then the branch count 404 in the hop entry is set to the number of the ports within the branch. For example, using the example of FIG. 6, original switch B will set the branch count to three. If the packet is going out of a single port only, then the branch count in the hop entry would be set to one.

Issued bcast traceroute packets are added 708 to a retransmission queue. If a sending switch (in this case, the original switch) does not receive an acknowledgement within a set period of time (for example, 4 seconds), then the switch retransmits the packet up to N times (for example, up to 2 times). If the retransmission fails, then the original switch informs 710 the user of the failure via a user interface or other communication means.

Figure 8:
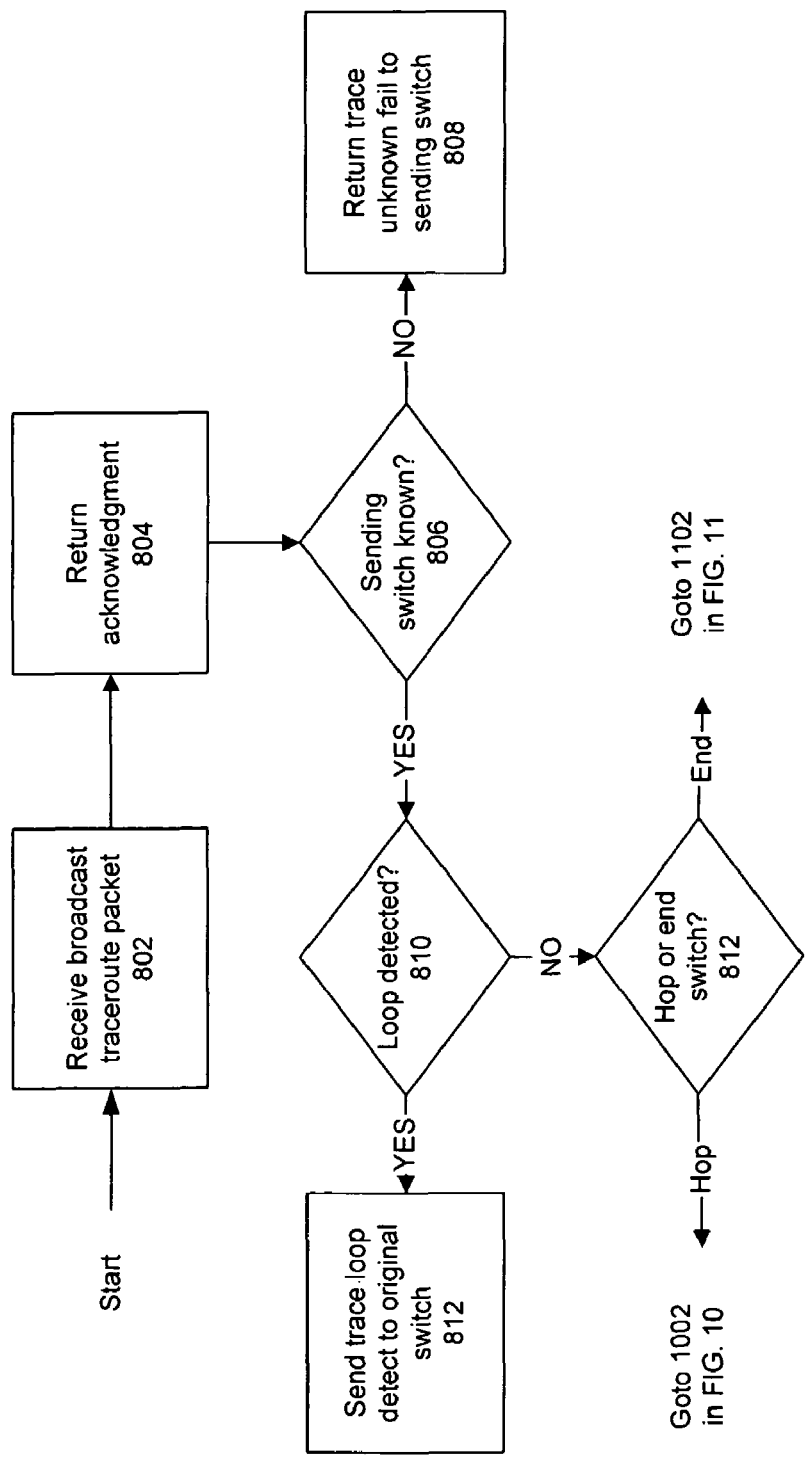
FIG. 8 is a flow chart depicting an automated process for a mesh switch receiving a broadcast traceroute packet in accordance with an embodiment of the invention.

FIG. 8 is a flow chart depicting an automated process for a mesh switch receiving a broadcast traceroute packet in accordance with an embodiment of the invention. As shown in the example procedure of FIG. 8, when a mesh switch receives 802 a bcast traceroute packet, the receiving mesh switch returns 804 an acknowledge (ack) packet to the sending mesh switch. The acknowledge packet indicates that the bcast traceroute packet has been received. A copy of the received packet may be modified to create the ack packet by changing the packet type to acknowledge (0×8E, for example).

The receiving switch determines 806 if it knows of the sending switch. In other words, the receiving switch determines if the MAC address within the MAC address within the latest hop entry corresponds to a known mesh switch. If the sending switch is unknown to the receiving switch, then the receiving switch returns 808 a trace unknown fail packet back to the sending switch via the port the packet was received on. The trace unknown fail packet may be generated by modifying a copy of the received packet, for example, by clearing the TRACE_DISCOVER mode flag and setting the TRACE_COMPLETE mode and TRACE_UNKNOWN_FAIL status flags.

If the sending switch is known to the receiving switch, then a determination 810 is made as to whether the broadcast path has looped. In particular, if the TRACE_DISCOVER mode flag is set and the loop bit for the receiving switch in the marked bits field 310 is already set, then the receiving switch has already seen this broadcast traceroute packet. This indicates that the bcast path has looped. If such a loop state is detected, then the receiving switch sends 812 a trace loop detect packet back to the original mesh switch. The trace loop detect packet may be generated by modifying a copy of the received packet, for example, by clearing the TRACE_DISCOVER mode flag and setting the TRACE_COMPLETE mode and TRACE_LOOP_DETECT status flags. Because the packet has been looped, the receiving switch can assume that the hop entries are or may be invalid. Hence, the trace loop detect packet is sent back to the original switch using the path through the mesh that is used for normal uni-cast traffic destined for the MAC address of the original mesh switch.

If no loop state is detected, then the receiving switch makes a determination 812 as to whether it is an end mesh switch or a hop mesh switch. The receiving switch is an end mesh switch if it does not have any outgoing ports in the broadcast path for the original mesh switch. If the receiving switch is a hop switch, then the procedure continues in block 1002 of FIG. 10. If the receiving switch is an end switch, then the procedure continues in block 1102 of FIG. 11.

Hop Mesh Switch Receiving Broadcast Traceroute Packet

Figure 9:
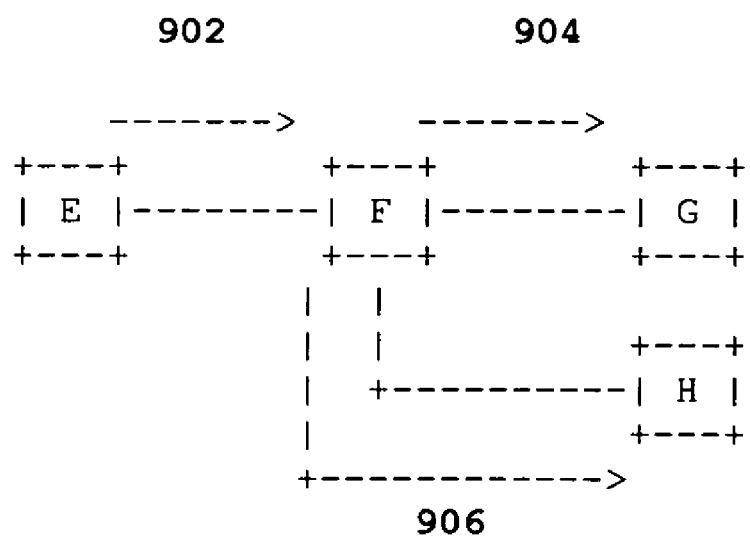
FIG. 9 is a diagram illustrating a hop switch forwarding broadcast traceroute packets to subsequent switches within the broadcast path of the original switch in accordance with an embodiment of the invention.

FIG. 9 is a diagram illustrating a hop switch forwarding broadcast traceroute packets to subsequent switches within the broadcast path of the original switch in accordance with an embodiment of the invention. FIG. 9 illustrates that a hop mesh switch may have many ports associated with the original mesh switch's broadcast path. Switch E is the original mesh switch, and switch F is a hop mesh switch which receives broadcast packets from switch E via 902. As shown in FIG. 9, switch F needs to forward switch E's broadcast packets to both switch G via 904 and switch H via 906.

Figure 10:
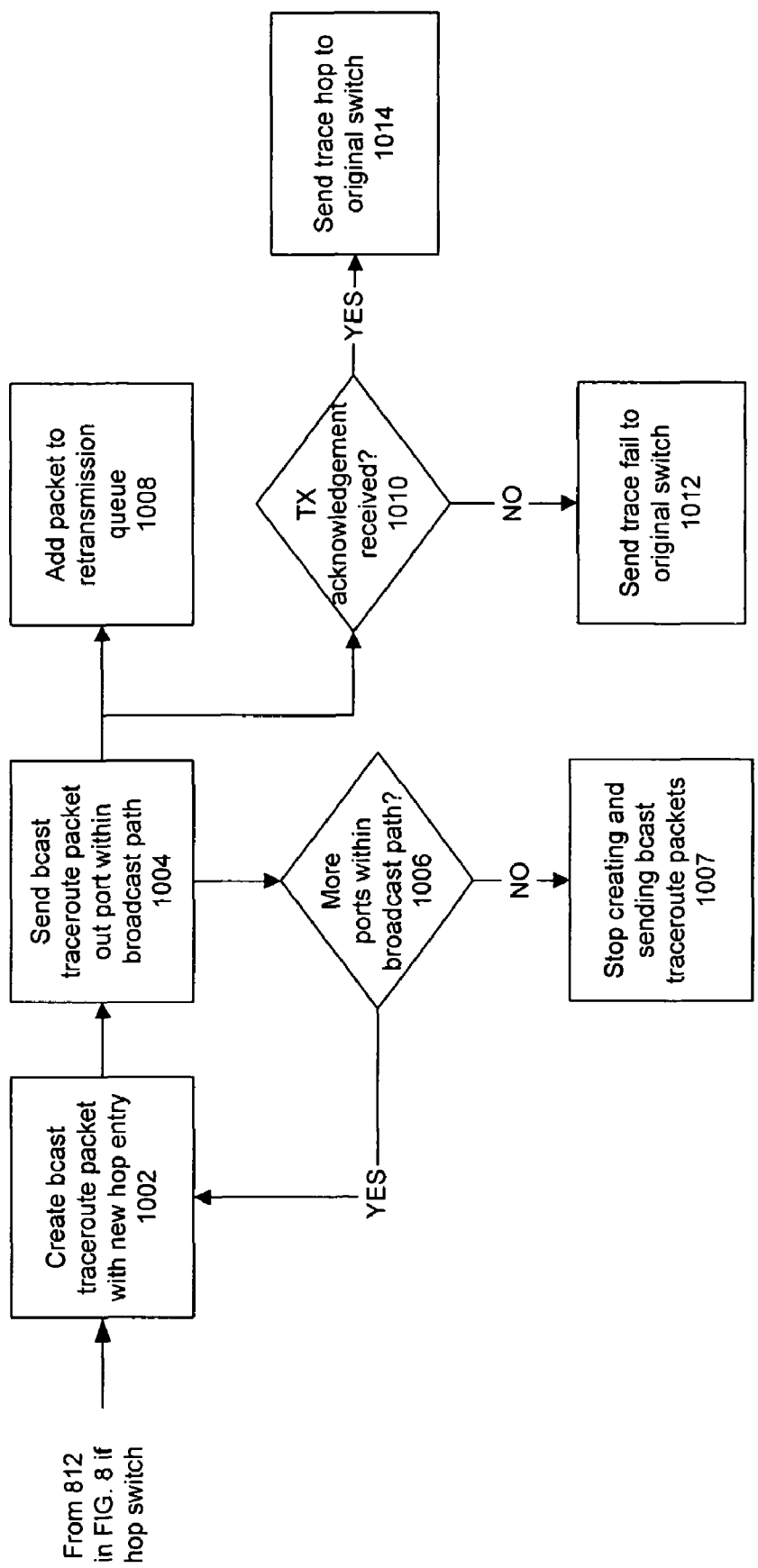
FIG. 10 is a flow chart continuing the automated process of FIG. 8 for a hop switch in accordance with an embodiment of the invention.

FIG. 10 is a flow chart continuing the automated process of FIG. 8 for a hop switch in accordance with an embodiment of the invention. As discussed further below, the hop switch issues a bcast traceroute packet out of each outgoing port that is within the broadcast path of the original switch.

As shown in the example procedure of FIG. 10, the hop switch creates 1002 a bcast traceroute packet with a new hop entry. The packet has the TRACE_DISCOVER flag marked to indicate that the trace is in the discovery mode. The new hop entry specifies the outbound port being used and is appended to the packet. This bcast traceroute packet is then sent or issued 1004 out of the outbound port. A determination 1006 may be made as to whether there are more ports on the hop switch within the original switch's broadcast path. If there are more ports within the original switch's broadcast path, then the process loops back to step 1002 and creates another bcast traceroute packet for another port within the original switch's broadcast path. Otherwise, the process stops 1007 creating and sending bcast traceroute packets. In other words, there may be more than one port of the hop switch within the original switch's broadcast path. If so, the hop switch sends or issues a bcast traceroute packet out of each such port. The output port number, name and speed will be changed for each issued bcast traceroute packet.

If the packet is going out multiple ports due to a branch in the broadcast tree, then the branch count 404 in the hop entry is set to the number of the ports within the branch. For example, using the example of FIG. 9, hop switch F will set the branch count to two. If the packet is going out of a single port only, then the branch count in the hop entry would be set to one.

Issued bcast traceroute packets are added 1008 to a retransmission queue by the hop switch. If a sending switch (in this case, the hop switch) does not receive an acknowledgement within a set period of time (for example, 4 seconds), then the switch retransmits the packet up to N times (for example, up to 2 times).

If acknowledgement of the transmission (or retransmission) of a packet is received so as to indicate a successful transmission, then a trace hop packet is sent 1014 from the hop switch to the original switch. The trace hop packet may be generated by modifying a copy of the received packet, for example, by clearing the TRACE_DISCOVER mode flag and setting the TRACE_HOP mode flag. The trace hop packet indicates to the original switch that this is a new hop in the broadcast path.

On the other hand, if no acknowledgement is received of the transmission and retransmissions, then a trace fail packet is sent 1012 back to the original mesh switch. The trace fail packet may be generated by modifying a copy of the received packet, for example, by clearing the TRACE_DISCOVER mode flag and setting the TRACE_COMPLETE mode and TRACE_RTX_FAIL status flags. The trace fail packet indicates to the original switch that the bcast traceroute failed due to a retransmission failure.

End Mesh Switch Receiving Broadcast Traceroute Packet

Figure 11:
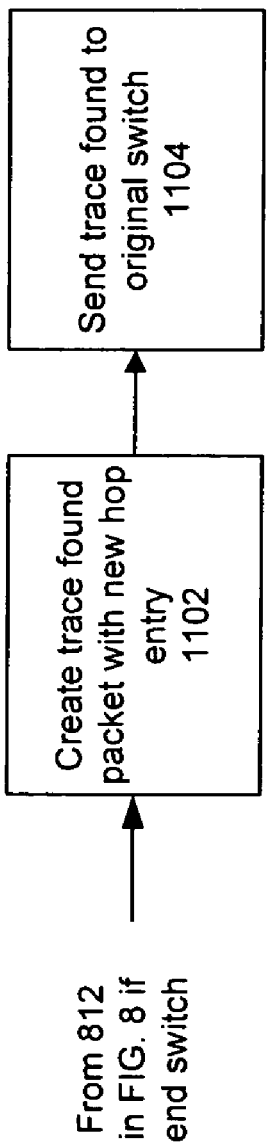
FIG. 11 is a flow chart continuing the automated process of FIG. 8 for an end switch in accordance with an embodiment of the invention.

FIG. 11 is a flow chart continuing the automated process of FIG. 8 for an end switch in accordance with an embodiment of the invention. The end switch creates 1102 a trace found packet and sends 1104 the trace found packet back to the original mesh switch. The trace found packet may be created 1102 by modifying a copy of the received packet, for example, by clearing the TRACE_DISCOVER mode flag and setting the TRACE_COMPLETE mode and TRACE_FOUND status flags. In addition, a new hop entry is appended to the packet. The new hop entry includes the switch MAC address of the end switch and the input port number and name based on the input port of the end switch on which the packet was received. The loop bit corresponding to the end switch would not be set in this scenario. The trace found packet indicates to the original switch that the bcast traceroute reached an end mesh switch.

Sending Trace Complete/Hop Packet Back to Original Mesh Switch

When the trace is complete (found), hits a failure, or reaches a hop switch, a packet will be sent back to the original mesh switch. The packet will be sent back in the reverse order that the packet has taken from the original mesh switch. This return path may be called a "reverse trace" path.

Figure 12:
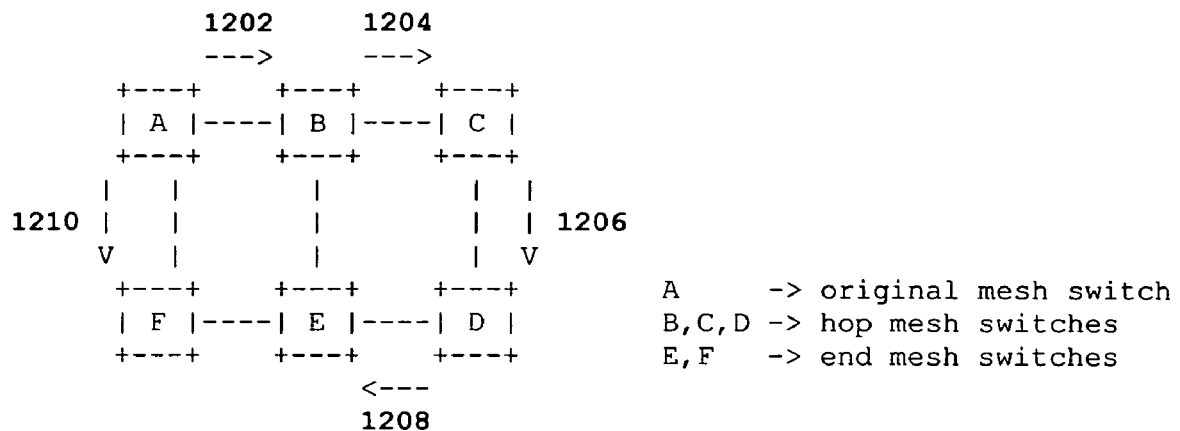
FIG. 12 is a diagram illustrating an example broadcast path through an example switching mesh in accordance with an embodiment of the invention.

FIG. 12 is a diagram illustrating an example broadcast path through an example switching mesh in accordance with an embodiment of the invention. In this example, switch A is the original mesh switch which has initiated the bcast traceroute. Switch A sends out a bcast traceroute packet to each of switches B (arrow 1202) and F (arrow 1210).

Switch F is an end switch because it does not have any ports within the original mesh switch's bcast path. As an end switch, switch F sends a trace found packet back to switch A (the original switch). The trace found packet may be created as discussed above in relation to block 1102 of FIG. 11. The trace found packet may be sent back to switch A using the path defined by the hop entries of the packet. In this instance, the return path would follow the reverse of arrow 1210.

Switch B is a hop switch because it does have a port within the original mesh switch's bcast path. As a hop switch, switch B sends a trace hop packet back to switch A (the original switch). The trace hop packet may be created as discussed above in relation to block 1014 of FIG. 10. The trace hop packet may be sent back to switch A using the path defined by the hop entries in the traceroute packet. In this instance, the return path would follow the reverse of arrow 1202. In addition, switch B forwards the traceroute packet to switch C (arrow 1204).

Switch C is a hop switch because it does have a port within the original mesh switch's bcast path. As a hop switch, switch C sends a trace hop packet back to switch A (the original switch). The trace hop packet may be sent back to switch A using the path defined by the hop entries in the traceroute packet. In this instance, the return path would follow the reverse of arrow 1204, then the reverse of arrow 1202. In addition, switch C forwards the traceroute packet to switch D (arrow 1206).

Switch D is a hop switch because it does have a port within the original mesh switch's bcast path. As a hop switch, switch D sends a trace hop packet back to switch A (the original switch). The trace hop packet may be sent back to switch A using the path defined by the hop entries in the traceroute packet. In this instance, the return path would follow the reverse of arrow 1206, then the reverse of arrow 1204, then the reverse of arrow 1202. In addition, switch D forwards the traceroute packet to switch E (arrow 1208).

Switch E is an end switch because it does not have any ports within the original mesh switch's bcast path. As an end switch, switch E sends a trace complete packet back to switch A (the original switch). The trace complete packet may be sent back to switch A using the path defined by the hop entries of the packet. In this instance, the return path would follow the reverse of arrow 1208, the reverse of arrow 1206, then the reverse of arrow 1204, then the reverse of arrow 1202.

Hop Mesh Switch Forwarding Complete/Hop Packet

Figure 13:
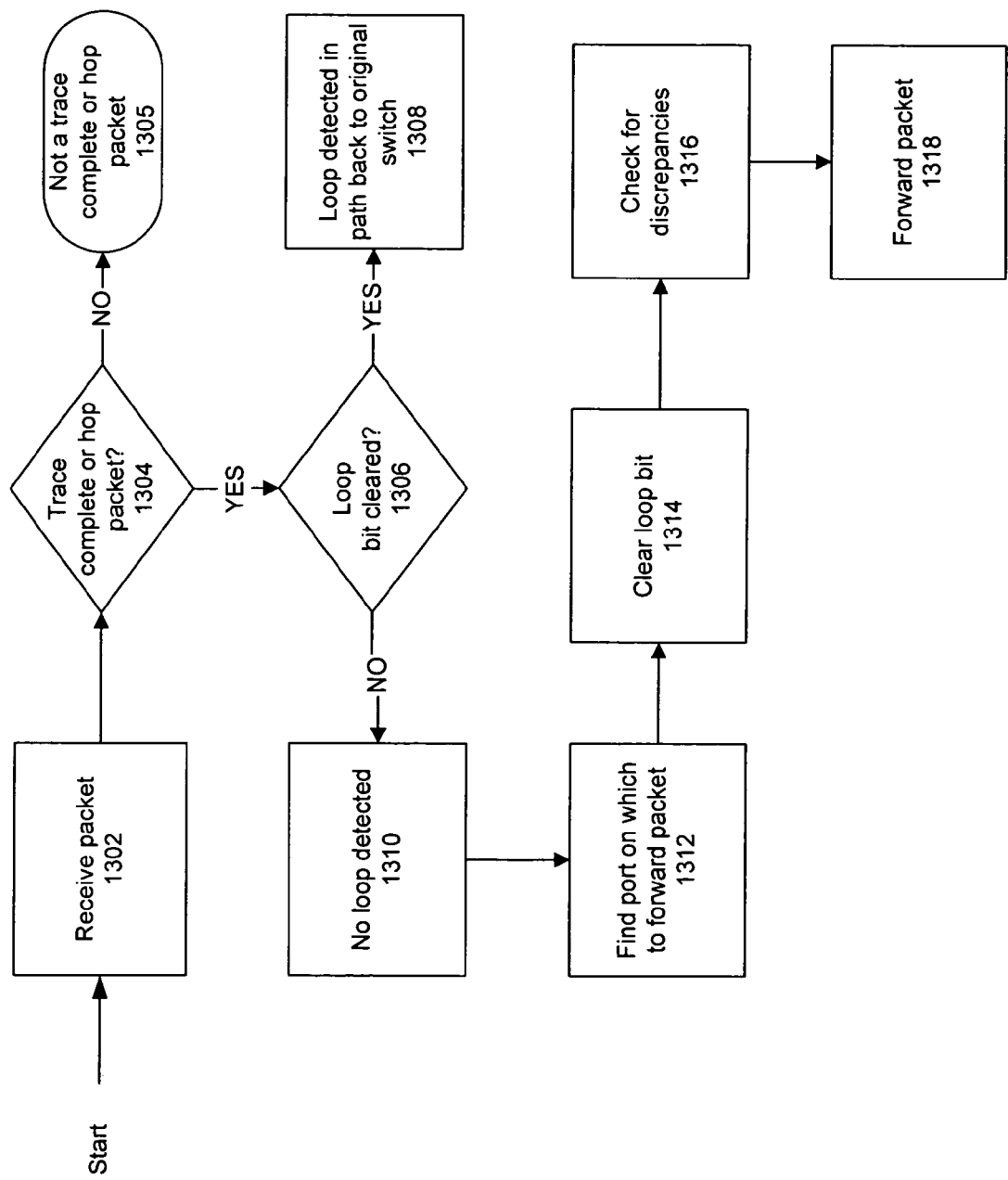
FIG. 13 is a flow chart depicting an automated process for a hop switch forwarding a packet back towards the original switch in accordance with an embodiment of the invention.

FIG. 13 is a flow chart depicting an automated process for a hop switch forwarding a packet back towards the original switch in accordance with an embodiment of the invention. When a hop switch receives 1302 a packet, the hop switch checks 1304 the flags field 308. If the TRACE_COMPLETE or TRACE_HOP mode flag is set, then the packet is a "reverse trace" packet headed back to the original switch. Otherwise, per block 1305, the rest of the process does not apply as this is not a trace complete or trace hop packet.

The hop mesh switch may then check 1306 to see if its loopbit is set in the marked bits field 310. If its loopbit is clear, then a loop is indicated 1308 in the path back to the original switch. On the other hand, if its loopbit is set, then a loop is not detected 1310 and this switch proceeds to forward this packet back to the original mesh switch.

The hop switch finds 1312 the port on which to send or forward the packet by looking for its entry in the hop entries 318 in the packet; (If there is no such hop entry, then the hop switch may discard the packet.) The input port number 409 in that hop entry is the port on which to send the packet. The hop mesh switch also clears 1314 its loop bit in the marked bits field 310 before sending the packet. This is done so as to be able to prevent loops in the "reverse trace" path back to the original switch.

The hop switch may also check 1316 for discrepancies, for example, by verifying that the port is still defined as a mesh port, the switch that is adjacent on that port is the same as in the previous hop entry (indicating that the port may have been disconnected and connected to a different switch), and so on. If such a discrepancy exists, then the hop switch may, for example, discard the packet. If no such discrepancy exists, then the hop switch may proceed to forward 1318 the packet on the above-discussed port.

Original Mesh Switch Receiving Packet

Figure 14:
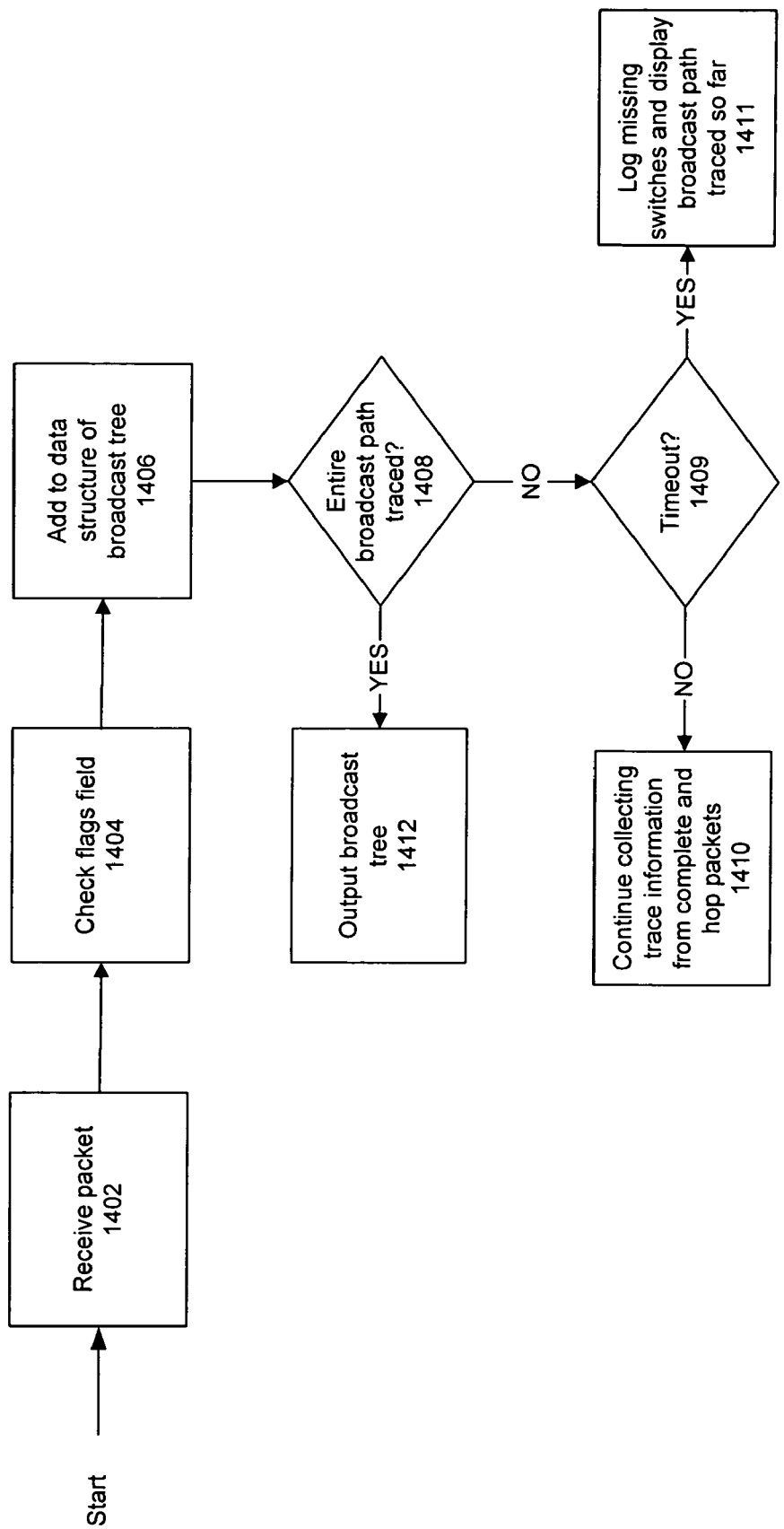
FIG. 14 is a flow chart depicting an automated process for the original switch receiving packets in accordance with an embodiment of the invention.

FIG. 14 is a flow chart depicting an automated process for the original switch receiving 1402 packets in accordance with an embodiment of the invention. When the original mesh switch receives a packet, it checks 1404 the flags field 308 to determine the information provided by the packet.

If the TRACE_HOP mode flag is set, then the packet is an update from a hop mesh switch. The information regarding this hop will be included in the information outputted to a user.

If the TRACE_COMPLETE mode flag is set, then the trace is complete. The status flags will then be checked to determine the success or failure of this particular trace. If the TRACE_UNKNOWN_ADDR_FAIL flag, TRACE_RTX_FAIL flag, or TRACE_LOOP_DETECT flag is set, then the trace failed, and the user may be informed of the failed trace. On the other hand, if the TRACE_FOUND flag is set, then the trace was a success and the information for the corresponding end switch will be included in the information outputted to the user.

When receiving the packets, the original mesh switch may add 1406 to a data structure of the broadcast tree so as to build the entire broadcast tree. The reason being that a broadcast path may branch off at the original switch or at a hop switch. Such branching means that there can be multiple TRACE_COMPLETE packets sent back to the original mesh switch.

By tracking the received TRACE_HOP and TRACE_COMPLETE packets, the original mesh switch may determine 1408 whether it has traced the entire broadcast path. For example, this determination may be made by counting the number of hop and end switches within its currently built tree and comparing that number against the mesh domain count (the number of mesh switches in the mesh domain). Alternatively, this determination may be made by checking the branch count field within the hop entries and verifying that an end switch has been found for each branch.

Until the entire broadcast path has been traced, the original switch checks 1409 to see if a timeout has occurred. A timeout may occur if the timer started 701 at the initiation of the broadcast traceroute reaches a preset time limit (for example, 30 seconds or another time limit). Upon a timeout, the original switch may assume that the broadcast trace has failed and may, for example, issue an error log 1411 indicating the switch or switches that have not responded and display the information gathered for the broadcast path up to this point. If the broadcast traceroute has not yet timed out, then the original switch continues 1410 to collect trace information from received trace complete and trace hop packets and continues to build the data structure of the broadcast tree.

Once the entire broadcast path has been traced, the original switch may output 1412 the broadcast tree information. For example, the information may be output by way of a user interface. Alternatively, the information may be incrementally output to the user as the trace progresses before the entire broadcast path has been traced.

Example User Interface

A user may type in a command to a user interface to perform a bcast traceroute. The command may be of the following form, for example.

switch$ bcastTraceroute [−V] [−i]

where −V is an optional verbose output mode (where all hop packets are displayed as they are received) and −i is a display input port option. Without options −V or −i selected, the display would be in normal mode.

Figure 15:
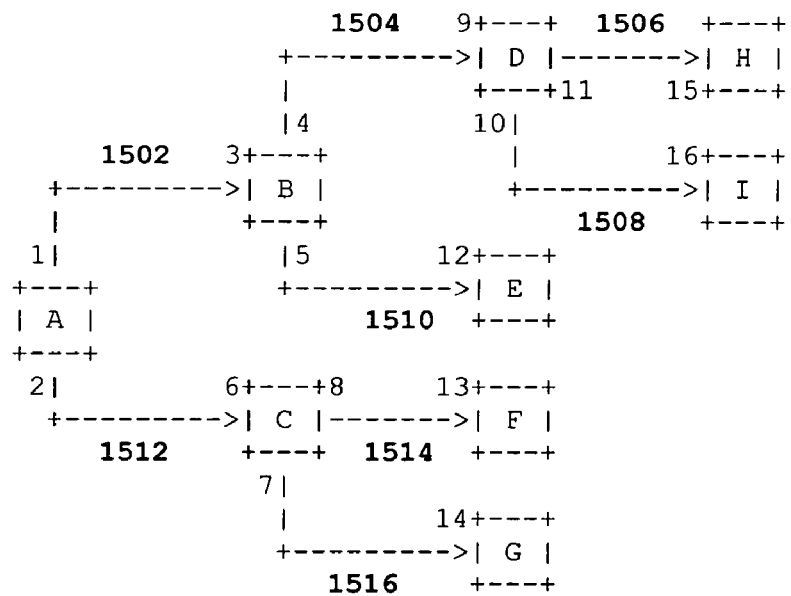
FIG. 15 is a diagram illustrating an example broadcast tree in accordance with an embodiment of the invention.

FIG. 15 is a diagram illustrating an example broadcast tree in accordance with an embodiment of the invention. In this example, there are two branches (1502 and 1512) from the original switch A. The first branch 1502 goes to hop switch B. The second branch 1512 goes to hop switch C.

There are two branches (1504 and 1510) from hop switch B. The first branch 1504 goes to hop switch D. The second branch 1510 goes to end switch E. There are two branches (1514 and 1516) from hop switch C. The first branch 1514 goes to end switch F. The second branch 1516 goes to end switch G.

There are two branches (1506 and 1508) from hop switch D. The first branch 1506 goes to end switch H. The second branch 1508 goes to end switch I.

FIGS. 16A, 16B and 16C show three example formats for outputting broadcast traceroute information for the broadcast tree of FIG. 15 to a user in accordance with an embodiment of the invention. FIG. 16A shows an example output in a normal mode format. The normal mode shows the broadcast trace, including output ports. FIG. 16B shows an example output with the display input port option activated. In this mode, both input and output ports are shown. FIG. 16C shows an example output in a verbose output mode (without the display input port option activated).

Use for Detection of Incomplete or Looped Bcast Paths

In another embodiment of the invention, the bcast traceroute protocol may be configured to run bcast traceroutes as a background process. The background process may be set to run periodically (for example, every half hour) so as to detect incomplete or looped broadcast paths within a switching mesh.

In another embodiment of the invention, the switches may be configured to automatically initiate a bcast traceroute trace from each mesh switch a relatively short time (for example, 3 to 5 minutes) after a link failure to ensure that the bcast paths in the switching mesh have been rebuilt properly.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method by a switch of tracing a broadcast path from the switch through a group of switches, the method comprising:

issuing a broadcast traceroute packet with at least one hop entry corresponding to each port within the broadcast path;

receiving trace hop and trace complete packets from other switches within the broadcast path; wherein the other switches in the broadcast path forwarding the trace hop and trace complete packets are configured to append at least cost entry to the trace hop and trace complete packets, the at least one cost entry expressing a cost factor associated with a link in a network, the cost entry further associated with a respective other switch; and upon receipt of the trace hop and trace complete packets from other switches within the broadcast path, determining a first broadcast path having a lowest total cost factor based upon the at least one cost entry.

2. The method of claim 1, further comprising building a data structure for a broadcast tree using information from the trace hop packets and the trace complete packets.

3. The method of claim 2, further comprising determining when the broadcast path has been entirely traced.

4. The method of claim 3, wherein the broadcast path is determined to be entirely traced by counting the number of the hop and end switches in the broadcast tree.

5. The method of claim 3, wherein the broadcast path is determined to be entirely traced by verifying that an end switch has been found for each branch of the broadcast tree.

6. The method of claim 1, wherein a trace loop detect packet is received by the switch if a loop is detected during the tracing of the broadcast path.

7. The method of claim 1, wherein the trace hop and trace complete packets are sent back to the switch by way of reverse trace paths determinable from hop entries the packets being sent back.

8. The method of claim 7, wherein detection of looping in a reverse trace path is performed when the trace hop and trace complete packets are being sent back to the switch.

9. The method of claim 1, wherein each hop entry comprises a switch mac address, input port information, and output port information.

10. The method of claim 9, wherein each hop entry further comprises a branch count.

11. The method of claim 1, wherein the broadcast traceroute packet comprises mode and status flags.

12. The method of claim 11, wherein the mode flags include trace hop and trace complete flags, wherein the trace hop flag is set for trace hop packets, and wherein the trace complete flag is set for trace complete packets.

13. The method of claim 11, wherein the status flags include trace found, and trace failure, and trace loop detect flags.

14. The method of claim 1, wherein the method is executed as a background process to detect incomplete or looped broadcast paths.

15. The method of claim 1, wherein the method is automatically executed after a link failure to ensure that the broadcast path has been rebuilt properly.

16. The method of claim 1, wherein the method is executed multiple times in order to perform a broadcast path runtime analysis.

17. A networking switch configured to be able to trace a broadcast path originating from the switch and passing through a group of switches, the network switch configured to execute computer-readable code stored on a computer readable medium, the computer readable code comprising:
- logic configured to issue a broadcast traceroute packet from each port of the switch within the broadcast path; and
- logic configured to process trace hop and trace complete packets received from other switches within the broadcast path, the other switches in the broadcast oath forwarding the trace hop and trace complete packets are configured to append at least one cost entry to the trace hop and trace complete packets, the at least one cost entry expressing a cost factor associated with a link in a network, the cost entry further associated with a respective other switch, and
- logic that determines upon receipt of the trace hop and trace complete packets from other switches within the broadcast oath a first broadcast path having a lowest total cost factor based upon the at least one cost entry.

18. The switch of claim 17, wherein the computer-readable code further comprises logic configured to add to a broadcast tree using information from the trace hop and trace complete packets.

19. The switch of claim 17, wherein the computer-readable code further comprises logic configured to determine when the broadcast path has been entirely traced.

20. The switch of claim 19, wherein the broadcast path is determined to be entirely traced by counting the number of hop and end switches in the broadcast tree.

21. The switch of claim 17, wherein the computer-readable code further comprises logic configured to time-out the broadcast traceroute after expiration of a preset time period.

22. The switch of claim 19, wherein the broadcast path is determined to be entirely traced by verifying that an end switch has been found for each branch.

23. A networking apparatus having a processor configured to execute procedures for a broadcast traceroute protocol, the procedures comprising:
- upon initiation of a broadcast traceroute at the apparatus, the apparatus issues broadcast traceroute packets to trace a broadcast path from the apparatus through a group of networking apparatus;
- upon receiving a broadcast traceroute packet originating from another networking apparatus, the apparatus determines whether the apparatus is in a hop or end position within a broadcast path of the originating apparatus, wherein when the apparatus is in a hop position, a trace hop packet including hop-related information is sent to the originating apparatus, when the apparatus is in an end position, a trace complete packet is sent to the originating apparatus, and the apparatus appends at least one cost entry to the trace hop packet or the trace complete packet, the at least one cost entry expressing a cost factor associated with a link in a network; and
- upon receipt of the trace hop packet and trace complete packet from other switches within the broadcast path, determining a first broadcast oath having a lowest total cost factor based upon the at least one cost entry.

24. The apparatus of claim 23, wherein the procedures further comprise:
- upon receiving a broadcast traceroute packet originating from another networking apparatus, the apparatus also determines whether the received packet has traveled around a loop.

25. The apparatus of claim 23, wherein the procedures further comprise:
- when the apparatus is in a hop position, a hop entry is added to the received broadcast traceroute packet, and the modified packet is forwarded to a next apparatus within the broadcast path of the originating apparatus.

26. The apparatus of claim 23, wherein the trace hop and trace complete packets are sent back to the originating apparatus by way of reverse trace paths determined from hop entries in the packets being sent back.

27. The apparatus of claim 23, wherein the trace hop and trace complete packets are sent back to the switch by way of reverse trace paths determined from hop entries in the broadcast traceroute packet.

28. The apparatus of claim 27, wherein the apparatus comprises a switch, and the group of networking apparatus comprises a group of switches.

29. The apparatus of claim 28, wherein the group of switches comprises a switching mesh.

* * * * *

UNITED STATES PATENT AND TRADEMARK OFFICE
CERTIFICATE OF CORRECTION

| | |
|---|---|
| PATENT NO. | : 7,636,315 B2 |
| APPLICATION NO. | : 11/157683 |
| DATED | : December 22, 2009 |
| INVENTOR(S) | : Shaun Kazuo Wakumoto et al. |

Page 1 of 1

It is certified that error appears in the above-identified patent and that said Letters Patent is hereby corrected as shown below:

In column 12, line 19, in Claim 1, after "least" insert -- one --.

In column 13, line 14, in Claim 17, delete "oath" and insert -- path --, therefor.

In column 13, line 23, in Claim 17, delete "oath" and insert -- path --, therefor.

In column 14, line 17, in Claim 23, delete "oath" and insert -- path --, therefor.

Signed and Sealed this

Twenty-seventh Day of April, 2010

David J. Kappos
*Director of the United States Patent and Trademark Office*